L. BOISARD.
METHOD OF CUTTING STRAIGHT, HELICOIDAL, AND CONICAL GEAR TEETH.
APPLICATION FILED JUNE 1, 1905.

906,189.

Patented Dec. 8, 1908.
2 SHEETS—SHEET 1.

Witnesses:
S. Ford
A. J. Hadden

Inventor:
Louis Boisard
by R. Hadden
His Attorney

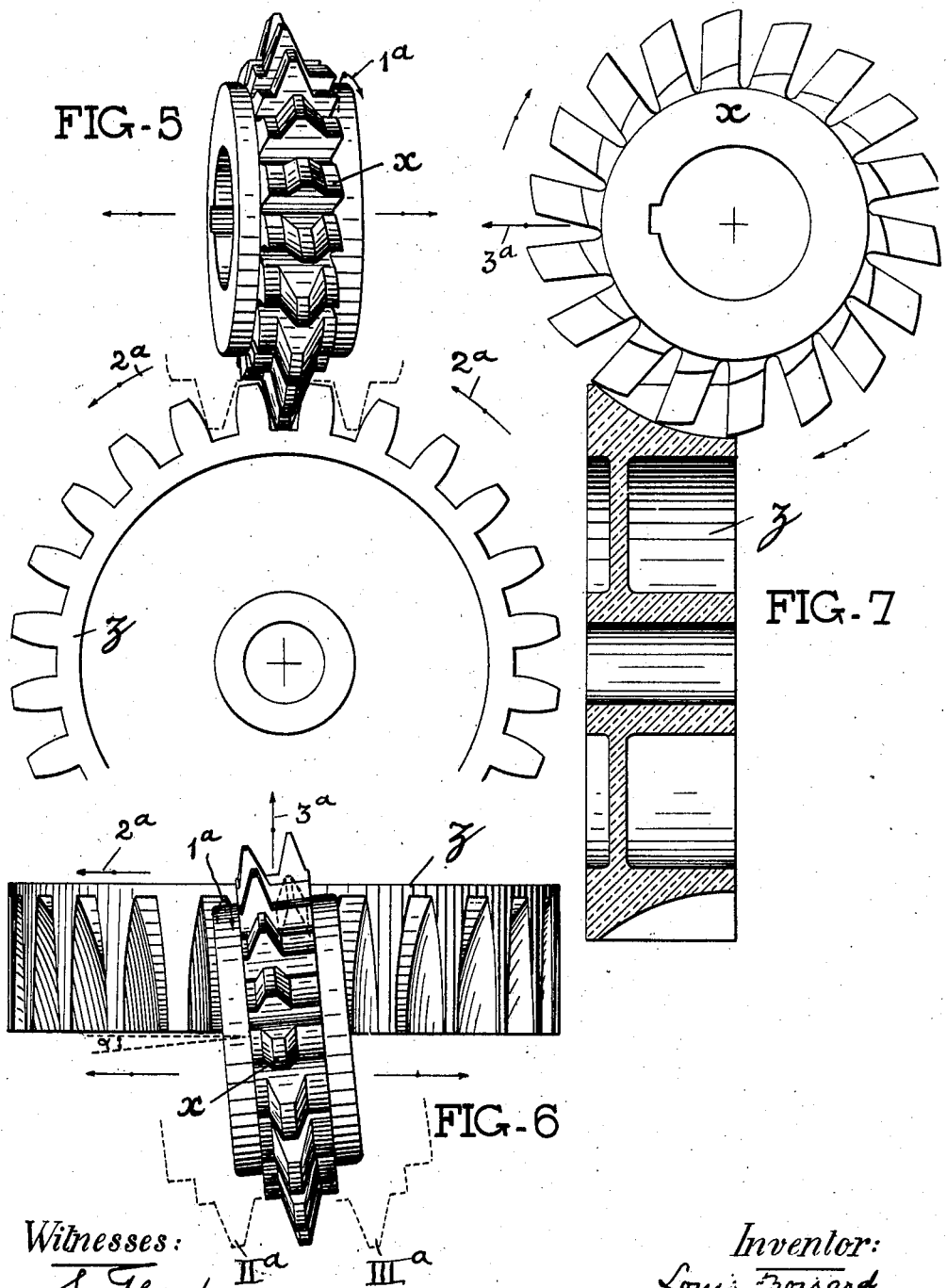

UNITED STATES PATENT OFFICE.

LOUIS BOISARD, OF LYON, FRANCE.

METHOD OF CUTTING STRAIGHT, HELICOIDAL, AND CONICAL GEAR-TEETH.

No. 906,189.　　　Specification of Letters Patent.　　　Patented Dec. 8, 1908.

Application filed June 1, 1905. Serial No. 263,225.

*To all whom it may concern:*

Be it known that I, LOUIS BOISARD, a citizen of the French Republic, residing at Lyon, France, have invented a certain new and Improved Method of Cutting Straight, Helicoidal, and Conical Gear-Teeth, of which the following is a specification.

This invention relates to an improved method of cutting gear teeth whereby the same cutter may be used for cutting the teeth of gear wheels of different pitch between the two extreme pitches for which the cutter has been designed.

Since the cutter when used in the manner hereinafter described is capable of cutting teeth of profile suitable for true rolling contact at any pitch between the two said extreme pitches, it can be used not only for the teeth of cylindrical wheels but also for teeth of beveled wheels provided the pitch near the apex and the pitch furthest from the apex do not respectively surpass the said extreme pitches. It can also be used for cutting helicoidal teeth on cylindrical and beveled gear wheels.

The cutter is produced by the superposition of two threads and is the subject of another patent granted to me 1st October 1907 No. 867,342.

The invention is illustrated in the annexed drawing, in which—

Figure 4:
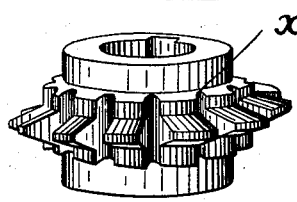
Figure 1:
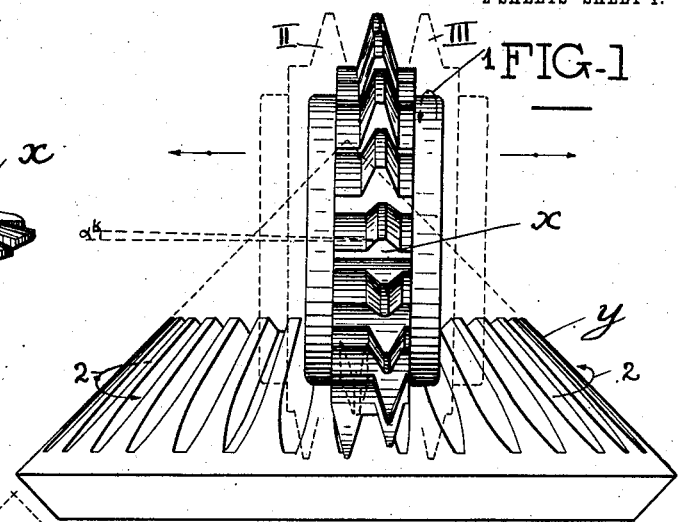
Figure 2:
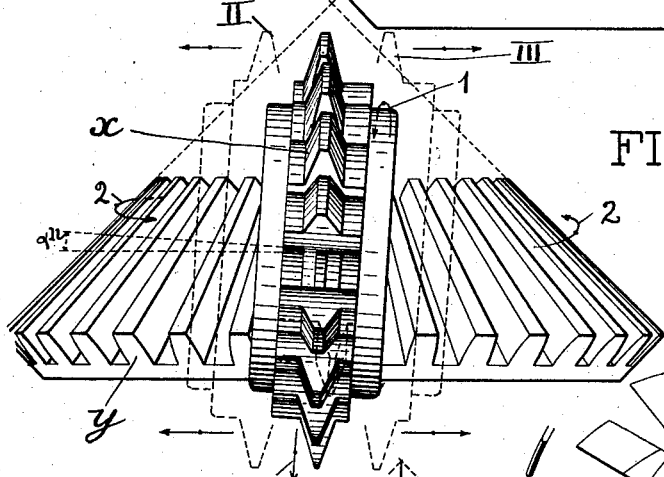
Figure 3:
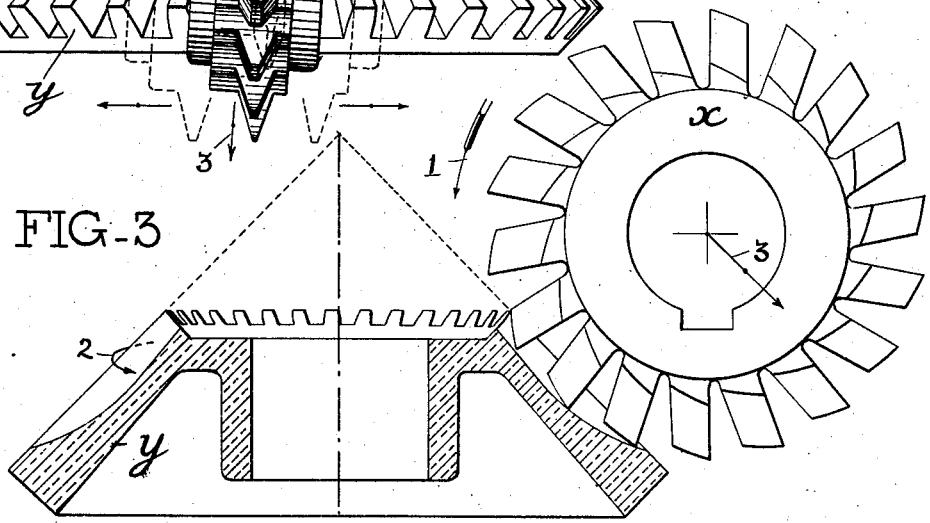

Figure 1 is a view illustrating the cutting of the teeth of a beveled wheel, the cutter being in the position corresponding to the cutting of the teeth where the pitch is smallest namely near the apex of the cone. Fig. 2 is a similar view illustrating the position of the cutter when the largest pitch is being cut. Fig. 3 is a sectional view illustrating the action of the cutter on a beveled wheel blank. Fig. 4 is a perspective view of the cutter. Fig. 5 is a view illustrating the cutting of the teeth of a straight wheel. Fig. 6 is a plan view of the same, and Fig. 7 is a sectional view illustrating the action of the cutter on the blank.

$x$ indicates the cutter, $y$ a beveled wheel, $z$ a straight or cylindrical wheel.

In order that this invention may be more easily understood I will first refer to the principles of the known method of cutting teeth by means of helicoidal cutters. Straight and helicoidal gear teeth have been cut hitherto by means of milling cutters in the form of helices the pitch ($p_1$) of which is, with regard to the pitch ($p$) of the gears to be cut, in the ratio:—$p = p_1 \cos.\alpha$ where $\alpha$ is the angle contained by a line perpendicular to a generator of the primary cylinder of the helical cutter and by a tangent to the helix at the intersection of this generator.

The operation of cutting a wheel of $n$ teeth is performed by inclining the cutter at the angle $\alpha$ with regard to the plane of the wheel and by revolving said cutter and wheel in such a manner that the wheel makes one revolution while the cutter makes $n$ revolutions.

The helical cutter as formerly used has a sufficient number of convolutions so that a longitudinal section approximates to a rack adapted to cut teeth which are theoretically exact. If the rack, that is to say the cutter, has teeth with straight symmetrical sides, it cuts a wheel the teeth of which are in profile cycloidal, and consequently a cutter with pitch $p_1$ will impart the exact profile to any wheel with pitch $p$, for any number of teeth provided, of course, that the cutter has either a sufficient number of convolutions to continue cutting action on the teeth until they are carried by the revolution of the blank out of the range of action of the cutting teeth or that a globular helical cutter is used.

The helical cutters hitherto used have had a single thread of given pitch and a plurality of convolutions. My improved cutter is constructed in a different way which may be described here for the better understanding of this invention although the said cutter forms the subject of a separate patent as previously referred to. It consists of a thread of a given pitch on which is superposed a thread of another pitch so that the cutting part is comprised only in that part which is common to the two threads. The constitution of this cutter is based on the theory that if the one thread is of pitch $p_1$ adapted to cut a straight gear of pitch $p$, and $p = p_1 \cos.\alpha$ and the other thread is of pitch $p_1^n$ adapted to cut a straight gear of pitch $p^n$, the cutter will be suitable for cutting either of the pitches $p$ or $p^n$ and also any pitch intermediate between $p$ and $p^n$. To cut a cylindrical wheel with this cutter, for example a wheel with $n$ teeth of pitch $p$, it will be necessary to give to the wheel an angle of inclination $\alpha$ corresponding to the pitch $p$. But as this cutter gives a small number of cutting edges confined within a relatively short length of convolution the number of convolutions is insufficient to allow of approximating the cutter to a rack. It will, therefore, be necessary to compensate for the absence of a sufficient number of convolutions of the thread by giving a supplementary movement by which the cutter, while revolving about its axis, is longitudinally and alternately displaced, the blank being moved about its axis to correspond with this movement of the cutter so as to present the hollows between the teeth to the cutting teeth of the cutter thread. The series of cutting teeth then successively assume a series of positions equivalent to the extension of the cutting teeth around a plurality of convolutions, thus producing a profile of true rolling contact and a theoretically accurate gear of pitch $p$ will be obtained. In an analogous manner a wheel having $n$ teeth of pitch $p^n$ can be obtained, the cutter being inclined at the angle $p_1^n$. For cutting a wheel with $n$ teeth of a pitch $p^k$ between $p$ and $p^n$ the cutter is inclined at the angle $a^k$ corresponding to this pitch.

The gear produced when the cutter is placed at a fixed angle of inclination only has the exact profile at the point where the pitch corresponds to this inclination. In cutting beveled gear the exact profile at all points is obtained by progressively varying the inclination of the cutter-holder between the angles corresponding to the smallest pitch and to the largest pitch respectively.

During the cutting the following movements are imparted to the cutter. 1. A positive rotary movement related to that of the gear wheel to be cut represented by arrows 1, 2 respectively in Figs. 1, 2 and 3 and 1ª and 2ª in Figs. 5 and 6, the gear wheel making one revolution while the cutter makes $n$ revolutions ($n$ being the number of teeth on the gear). 2. An alternating movement of the cutter along its axis, during which it moves with it the wheel to be cut, in order to compensate for the insufficient number of convolutions of thread on the cutter, as shown by the dotted positions II, III of the cutter I in Figs. 1 and 2 and the positions IIª and IIIª in Fig. 6. 3. A forward movement of the cutter tangentially to the base of the tooth-spaces and following the generator of the cone or cylinder through the point of contact as indicated by arrow 3 in Figs. 2 and 3 or 3ª in Figs. 6 and 7. For cutting beveled gears a fourth movement is necessary namely a movement which changes in a continuous manner, the inclination of the axis between the angles corresponding to the extreme pitches of the gear as will be seen by comparing the angle of inclination of the cutter in Figs. 1 and 2 respectively.

The system described can be used for cutting helicoidal bevel-gears as well as for cutting straight gears. For this purpose it is sufficient to incline the cutter, with regard to the axis of the gear, at an angle equal to the inclination of the helicoidal teeth, without prejudice to the variable inclination corresponding to the pitch. The cutter advances tangentially along the base of the tooth-spaces, but according to the tangent of the helix wound on the cone, which determines the gear, as is done in the Godinot machine for cutting helicoidal cylindrical gears. For the same purpose a differential device might be used, as in the Reinecker, Biernatzki and other machines for cutting helicoidal cylindrical gears.

I claim:

1. The method for cutting cylindrical gears with a cutter the cutting teeth of which are comprised in the parts common to two superposed threads of different pitches, said method consisting in placing the cutter with its axis inclined at an angle corresponding with the pitch of the teeth to be cut, and giving to the cutter and blank the following relative movements, namely, a movement of translation of the cutter along the generator of the blank, a reciprocatory movement of the cutter tangential to the blank, and relative rotational movement of the blank and cutter each on its axis.

2. The method for cutting beveled gears with a cutter the cutting teeth of which are comprised in the parts common to two superposed threads of different pitches, said method consisting in giving to the cutter and blank the following relative movements, namely, a movement of translation of the cutter along the generator of the blank a movement of progressive inclination of the axis of the cutter to a plane containing the axis of the blank in proportion to the increase of pitch, a reciprocatory movement of the cutter tangential to the blank, and relative rotational movement of the blank and cutter each on its axis.

3. The method for cutting beveled gears with a cutter the cutting teeth of which are comprised in the parts common to two superposed threads of different pitches, said method consisting in placing the cutter with its axis inclined at an angle corresponding with the pitch of the teeth to be cut at the smallest diameter of the blank, and giving to the cutter and blank the following relative movements, namely, a movement of translation of the cutter along the generator of the blank, a movement of progressive increase of inclination of the axis of the cutter to a plane containing the axis of the blank as the cutter descends the generator, a reciprocatory movement of the cutter tangential to the blank, and relative rotational movement of the blank and cutter each on its axis.

4. The method for cutting helicoidal gears with a cutter the cutting teeth of which are comprised in the parts common to two superposed threads of different pitches, said method consisting in placing the cutter with its axis inclined at an angle equal to the algebraical sum of the angle which corresponds with the pitch of the teeth to be cut and the helical angle of the gear, and giving to the cutter and blank the following relative movements, namely, a movement of translation of the cutter along the generator of the blank, a reciprocatory movement of the cutter tangential to the blank, and relative rotational movement of the blank and cutter each on its axis.

5. The method for cutting helicoidal beveled gears with a cutter the cutting teeth of which are comprised in the parts common to two superposed threads of different pitches, said method consisting in placing the cutter with its axis inclined at an angle equal to the algebraical sum of the angle which corresponds with the pitch of the teeth to be cut at the smallest diameter of the blank, and the helical angle of the gear, and giving to the cutter and blank the following relative movements, namely, a movement of translation of the cutter along the generator of the blank, a movement of progressive increase of inclination of the axis of the cutter to a plane containing the axis of the blank as the cutter descends the generator, a reciprocatory movement of the cutter tangential to the blank, and relative rotational movement of the blank and cutter each on its axis.

In witness whereof I have signed this specification in the presence of two witnesses.

LOUIS BOISARD.

Witnesses:
   JEAN GERMAIN,
   GUILLAUME PIOCHE.